(No Model.)
D. LIPPY & I. E. FINFROCK.
DRIVING GEAR FOR BICYCLES.
No. 528,955. Patented Nov. 13, 1894.
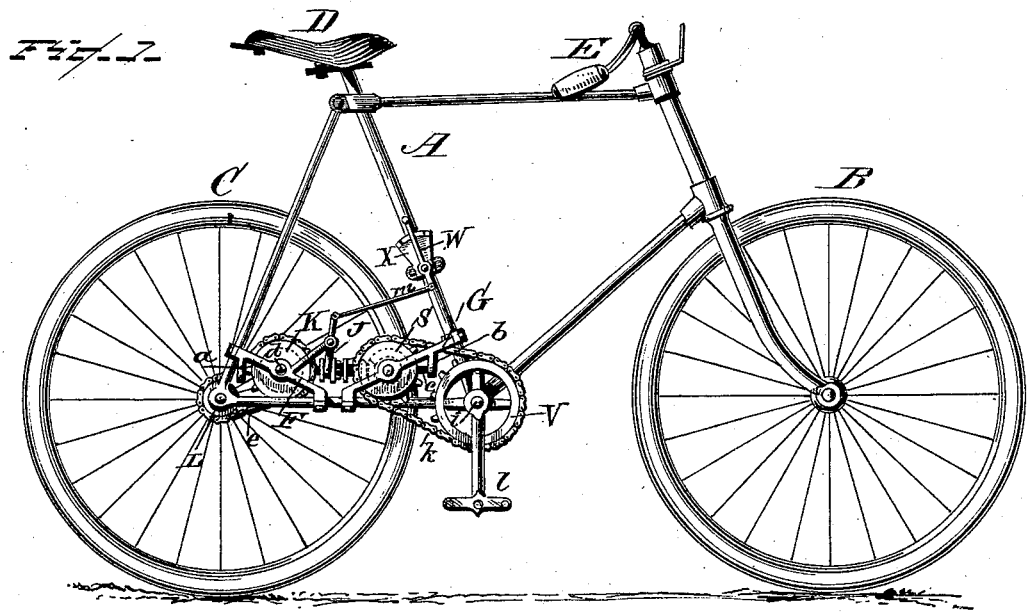
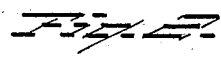
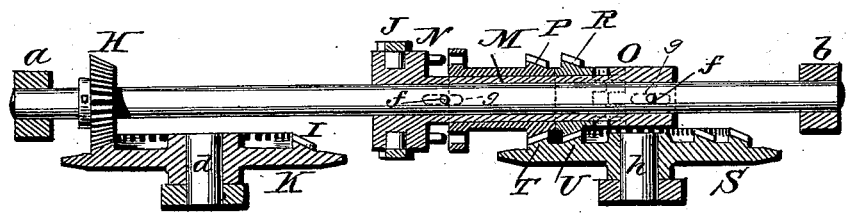
Witnesses
C. J. Williamson
G. Goddard
Inventors
David Lippy
Ira Elmer Finfrock
per Chas. H. Fowler
Attorney

UNITED STATES PATENT OFFICE.

DAVID LIPPY AND IRA ELMER FINFROCK, OF MANSFIELD, OHIO.

DRIVING-GEAR FOR BICYCLES.

SPECIFICATION forming part of Letters Patent No. 528,955, dated November 13, 1894.

Application filed June 26, 1894. Serial No. 515,741. (No model.)

*To all whom it may concern:*

Be it known that we, DAVID LIPPY and IRA ELMER FINFROCK, citizens of the United States, residing at Mansfield, in the county of Richland and State of Ohio, have invented certain new and useful Improvements in Driving-Gear for Bicycles; and we do hereby declare that the following is a full, clear, and exact description of the same, reference being had to the annexed drawings, making a part of this specification, and to the letters of reference marked thereon.

The present invention has relation to that class of differential speed mechanism for bicycles in which provision is made for changing the speed and power of the machine to adapt it to the nature or character of the road over which the machine is propelled without the necessity of the rider dismounting and also to enable the pedal-shaft to be disconnected from the gearing when desired to use the machine in "coasting" on down grades.

It is the object of the invention to improve this differential speed-mechanism whereby lightness, strength and durability are secured and the mechanism be simple in construction and easily operated by the rider without dismounting and while the machine is in motion, which objects are attained by the mechanism substantially as shown in the drawings and hereinafter described and claimed.

Figure 1 of the drawings represents a side elevation of a bicycle with our improved differential speed mechanism applied thereto. Fig. 2 represents a plan view of the speed mechanism on an enlarged scale and partly in section.

In the accompanying drawings A represents the frame of the machine which may be of the usual construction, and B C are the front and rear wheels respectively, said frame supporting the usual saddle D and provided with the handle-bar E, all of which are of the usual construction.

That portion of the differential speed mechanism which constitutes our invention is supported by two brackets F G of any preferred form and construction which are detachably connected to the frame of the machine by coupling collars or by any other well known means found best adapted to the purpose. These bracket are provided with hangers $a$ $b$ respectively to form bearings for the end of a horizontal shaft $c$ and upon the rear end of this shaft is keyed or otherwise suitably connected a pinion H, which pinion meshes with the teeth upon a bevel gear I formed upon the inner face of a sprocket-wheel K. This sprocket-wheel is loosely mounted upon a stationary stud $d$ projecting from the bracket F and is connected with a small sprocket-wheel L upon the hub of the rear bicycle-wheel by means of a sprocket-chain $e$. The shaft $c$ has a sleeve M adapted to slide lengthwise thereon but prevented from turning upon its axis by means of pins $f$ in the shaft, the ends of which project through elongated slots $g$ in the sleeve. This sleeve M has clutches of suitable and well-known construction upon the ends thereof, as shown at N O which engage respectively with pinions P R and are independent of each other so that when not engaged with the clutches the pinions will remain stationary while the shaft revolves. A sprocket-wheel S is loosely mounted upon a stationary stud $h$ projecting from the bracket G and has upon its face a double bevel gear T U with which engage the pinions P R respectively. This sprocket-wheel S connects with the sprocket-wheel V upon the pedal-shaft $i$ by means of a sprocket-chain $k$, said shaft having the usual pedals $l$.

Any suitable means may be provided for operating the slidable sleeve M with its clutches, and any suitable form of clutch and means for connecting it with the pinions may be substituted for the construction shown.

The means for operating the clutch-sleeve which are shown in the present instance, consist of the forked-lever J pivoted to the bracket F and adapted to engage with the clutch N, said lever having connected thereto a rod $m$ which in turn is connected with a shifting-lever W pivoted to a notched-bracket X upon the frame of the machine to hold the lever in its adjusted position. When the clutch is shifted to engage with the pinion P, said pinion will turn with the shaft and meshing with the large gearing T, speed will be obtained with decreased power, and when the clutch O is made to engage the pinion R, which pinion meshes with the smaller gear U, increased power with decreased speed will be the result. When the clutches are in the position shown in Fig. 2 so as not to engage with either of the pinions, the pedal-shaft will be disconnected from the gearing which is desirable when "coasting" on a downgrade.

The brackets enable the differential speed mechanism to be connected to the frame of any of the "safety" bicycles with comparatively little trouble and as conveniently disconnected.

Having now described our invention, what we claim as new, and desire to secure by Letters Patent, is—

1. A driving gear for bicycles, consisting of suitable brackets detachably connected to the bicycle-frame, a horizontal shaft having its bearings in the brackets, a slidable sleeve upon the shaft provided with clutches at its ends, independent pinions upon the sleeve, and a sprocket wheel having upon its face double bevel gears to engage with the pinions, and a sprocket chain engaging said sprocket wheel with a sprocket wheel upon the pedal-shaft, and means for connecting the horizontal shaft with the driving wheel substantially as and for the purpose set forth.

2. A driving gear for bicycles, consisting of suitable brackets adapted for attachment to the bicyle-frame, a horizontal shaft having its bearings in the brackets, a pinion keyed to the rear end of the shaft, a sprocket wheel engaging with the sprocket wheel upon the hub of the rear bicycle wheel through the medium of a sprocket-chain, a bevel gear upon the face of the sprocket-wheel to engage with the pinion, a slidable sleeve upon the shaft having clutches upon its ends, independent pinions upon the sleeve with which the clutches engage, a sprocket-wheel having upon its face double beveled gears to engage with the pinions, said sprocket wheel engaging with the sprocket wheel upon the pedal-shaft by means of a sprocket-chain, substantially as and for the purpose set forth.

In testimony that we claim the above we have hereunto subscribed our names in the presence of two witnesses.

DAVID LIPPY.
IRA ELMER FINFROCK.

Witnesses:
BURTON J. OUSTINE,
W. H. GIFFORD.